United States Patent
Abrahamsson et al.

(10) Patent No.: US 8,706,162 B1
(45) Date of Patent: Apr. 22, 2014

(54) AUTOMATIC ROUTING OF CALL AUDIO AT INCOMING CALL

(71) Applicants: Magnus Abrahamsson, Löddeköpinge (SE); Martin Nyström, Hörja (SE)

(72) Inventors: Magnus Abrahamsson, Löddeköpinge (SE); Martin Nyström, Hörja (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/785,678

(22) Filed: Mar. 5, 2013

(51) Int. Cl.
*H04M 1/00* (2006.01)

(52) U.S. Cl.
USPC .................................. 455/556.1; 455/575.2

(58) Field of Classification Search
USPC .................................. 455/567, 556.1, 575.2
See application file for complete search history.

(56) References Cited

U.S. PATENT DOCUMENTS

| 6,411,828 B1* | 6/2002 | Lands et al. ............... 455/569.1 |
| 2007/0041582 A1* | 2/2007 | Lam .............................. 379/908 |
| 2012/0220234 A1* | 8/2012 | Abreu ......................... 455/41.2 |

\* cited by examiner

*Primary Examiner* — Creighton Smith
(74) *Attorney, Agent, or Firm* — Snyder, Clark, Lesch & Chung, LLP

(57) ABSTRACT

A mobile device receives notification of an incoming call and identifies that an external speaker is connected to the mobile device. The mobile device detects that a user has positioned the mobile device in a position, relative to the user, to use an integrated ear speaker of the mobile device. When the mobile device detects that the user has positioned the mobile device in position to use the integrated ear speaker, the mobile device answers the incoming call and routes audio for the incoming call away from the external speaker and to the integrated ear speaker.

20 Claims, 6 Drawing Sheets

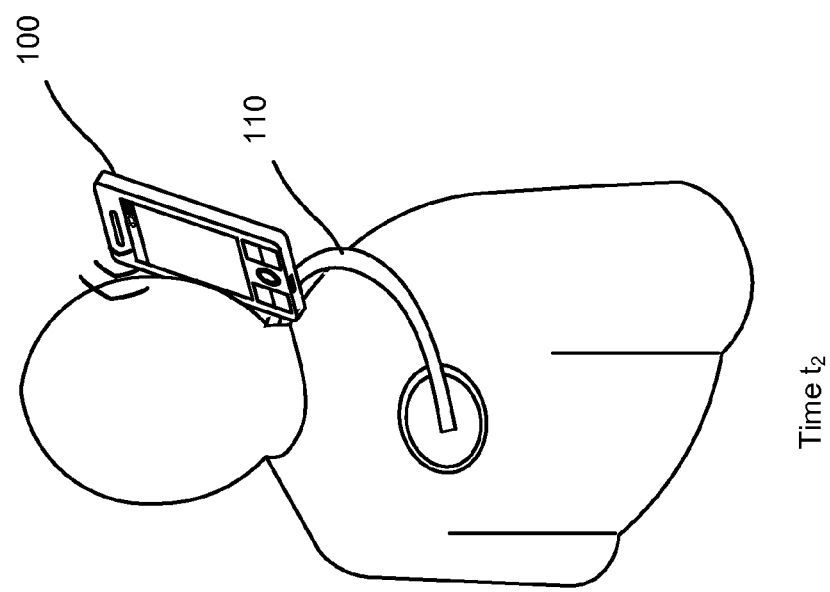
FIG. 1
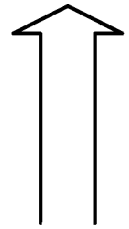
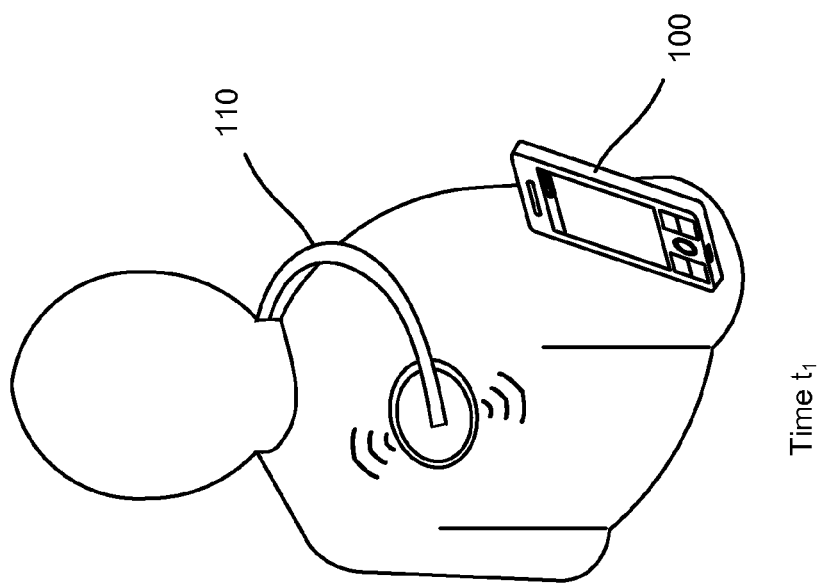

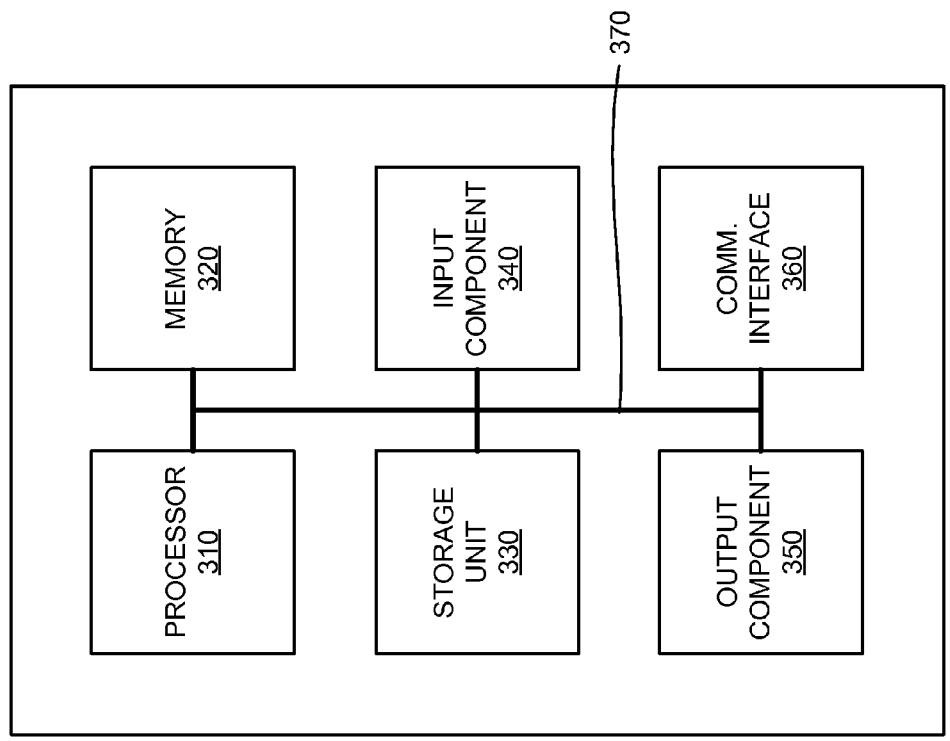

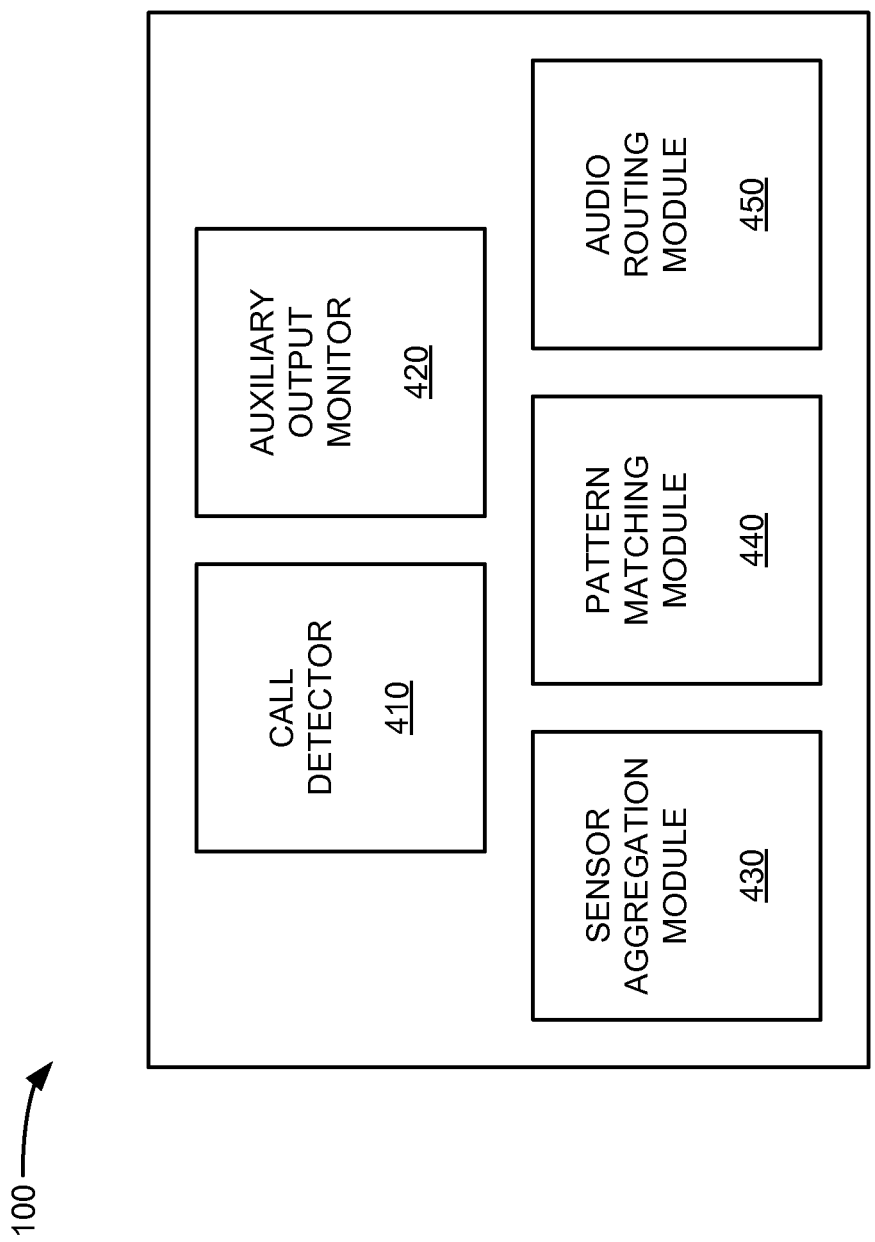

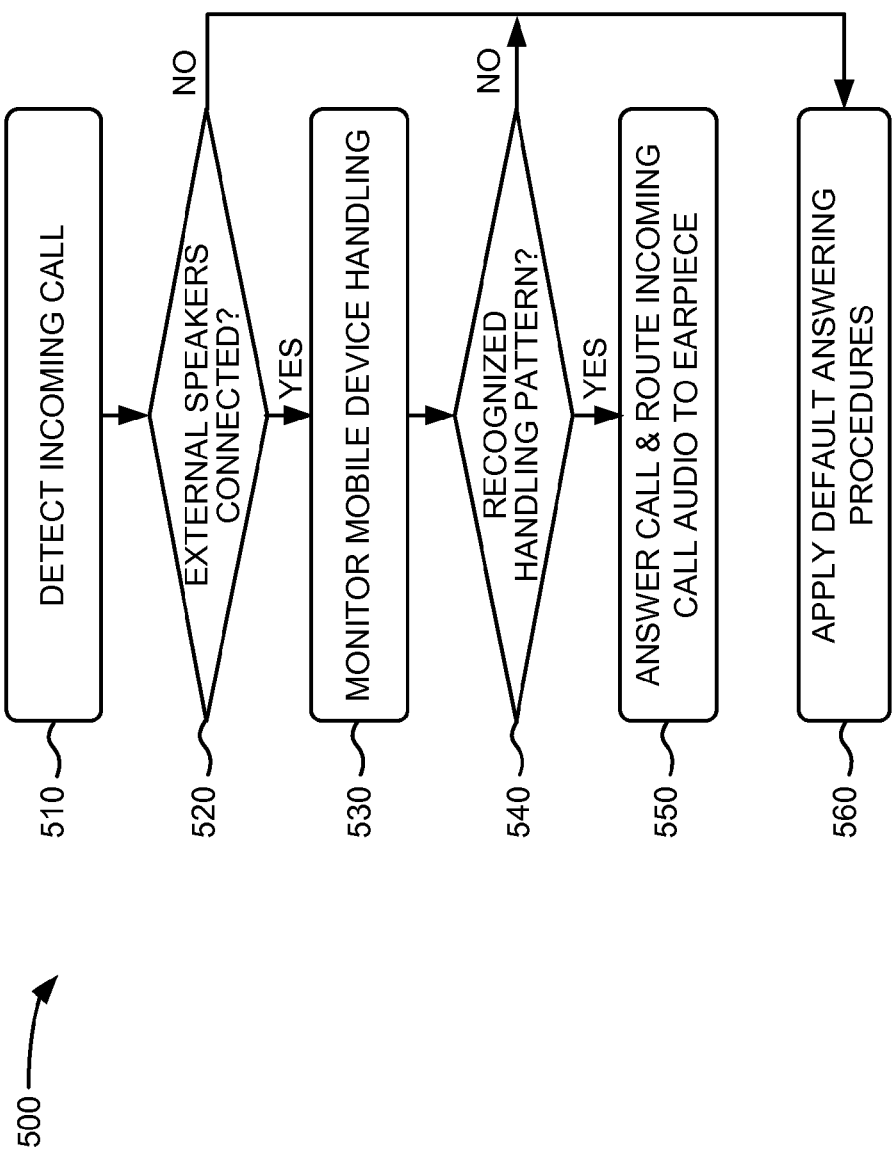

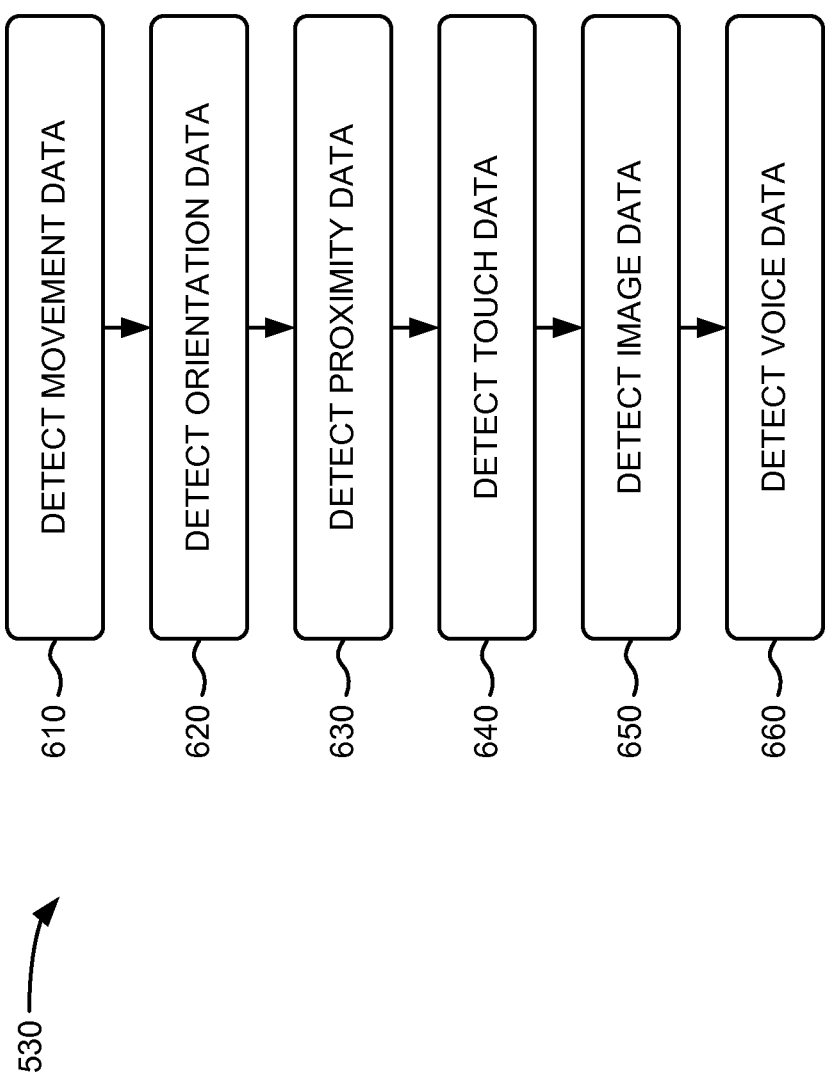

AUTOMATIC ROUTING OF CALL AUDIO AT INCOMING CALL

BACKGROUND

Today's mobile devices provide multiple functions. For example, a smart phone may provide users with the ability to send and receive private calls, conduct conference calls, play games, listen to music, view videos, etc. These devices may have multiple forms of audio input/output which may include an integrated ear speaker and microphone, a wired jack (e.g., for headphones), wireless interfaces (e.g., BLUETOOTH) for external devices, a speaker-phone, etc. Different audio inputs may be preferable for different functions of the mobile device.

SUMMARY

According to one aspect, a method may be performed by a mobile device. The method may include receiving notification of an incoming call; identifying that an external speaker is connected to the mobile device; detecting that a user has positioned the mobile device in a position, relative to the user, to use an integrated ear speaker of the mobile device; and routing audio for the incoming call away from the external speaker and to the integrated ear speaker when the mobile device detects that the user has positioned the mobile device in position to use the integrated ear speaker.

Additionally, the method may include answering the call when the mobile device detects that the user has positioned the mobile device in position to use the integrated ear speaker.

Additionally, detecting that a user has positioned the mobile device in a position to use the integrated ear speaker may further include monitoring handling activities for the mobile device during a ringing period associated with the notification, comparing data from the monitored handling activities against stored handling patterns that are indicative of positioning the mobile device near the user's ear, and identifying a match between the monitored data and one of the stored handling patterns.

Additionally, the monitoring the handling activities may include collecting one or more of: proximity sensor data, accelerometer data, gyroscope data, magnetometer data, touch data, or camera data.

Additionally, the monitoring the handling activities may further include collecting voice data.

Additionally, the routing audio for the incoming call may include overriding default audio routing to the external speakers.

Additionally, the external speakers may be connected via a wireless connection.

Additionally, the external speakers may be connected via a wired connection.

Additionally, the external speakers may include one or more of headphones, portable speakers, a hands-free headset, an external display, a home audio system, or car audio system.

According to another aspect, a device may include an integrated ear speaker for outputting sound; an interface to divert sound from the integrated ear speaker to an external speaker; a memory to store instructions and a processor. The processor may execute the instructions in the memory to receive notification of an incoming audio call; identify that the external speaker is connected to the mobile device; detect that a user has moved the mobile device in a position to use the integrated ear speaker; and route audio for the incoming call to the integrated ear speaker when the mobile device detects that the user has positioned the mobile device in position to use the integrated ear speaker.

Additionally, the processor may be further configured to answer the call when the mobile device detects that the user has moved the mobile device in position to use the integrated ear speaker.

Additionally, when, detecting that the user has moved the mobile device, the processor may be further configured to monitor handling activities for the mobile device during a ringing period associated with the notification, compare data from the monitored handling activities against stored handling patterns that are indicative of positioning the mobile device near the user's ear, and identify a match between the monitored data and one of the stored handling patterns.

Additionally, when monitoring the handling activities, the processor may be further configured to collect proximity sensor data, collect accelerometer data, collect gyroscope data, collect magnetometer data, collect touch data, or collect camera data.

Additionally, when monitoring the handling activities, the processor may be further configured to collect voice data.

Additionally, when routing audio for the incoming call, the processor may be further configured to override default audio routing to the external speakers.

Additionally, the mobile device may include a smart phone, a cellular telephone, or a hand-held computational device.

Additionally, the interface may include an audio port that supports a wired interface with the external speakers.

Additionally, the interface may include one or more of a personal area network (PAN) interface, a near-field communication (NFC) interface, or a wireless local area network (WLAN) interface for communicating with the external speakers.

According to yet another aspect, a tangible, non-transitory computer-readable medium may include one or more instructions for receiving notification of an incoming call to a mobile device; identifying that an external speaker is connected to the mobile device; detecting that a user has positioned the mobile device in a position, relative to the user, to use an integrated ear speaker of the mobile device; answering the incoming call when the mobile device detects that the user has positioned the mobile device in position to use the integrated ear speaker; and routing audio for the incoming call away from the external speaker and to the integrated ear speaker when the mobile device detects that the user has positioned the mobile device in position to use the integrated ear speaker.

Additionally, the computer-readable medium may include one or more instructions for detecting that the incoming call has been terminated, and routing post-call audio to the external speaker based on the detecting that the incoming call has been terminated.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 1 provides an illustration of concepts described herein;

FIG. 3 is a block diagram of exemplary components of a device of FIG. 2;

FIG. 4 is a block diagram of exemplary functional components of a mobile computing device of FIG. 2; and FIGS. 5 and 6 are flow diagrams of an exemplary process for automatically routing audio for an incoming call according to an implementation described herein.

DETAILED DESCRIPTION

Figure 2:
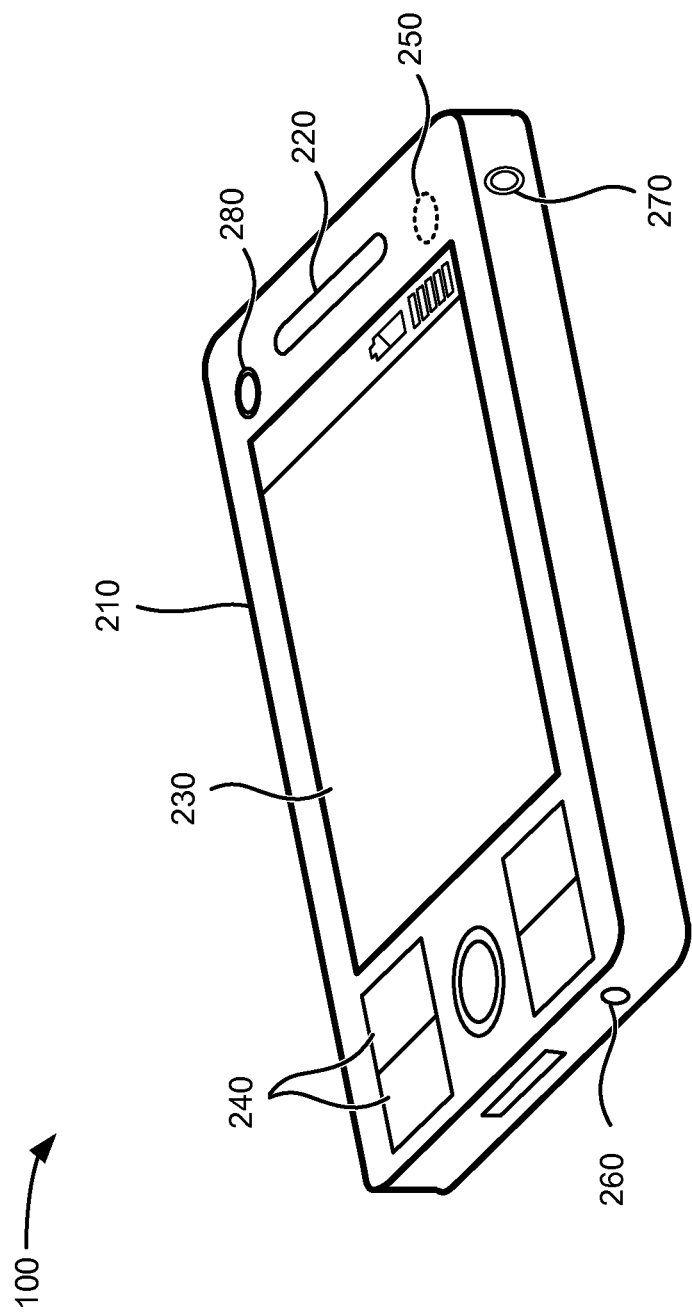
FIG. 2 shows an exemplary device in which concepts described herein may be implemented.

The following detailed description refers to the accompanying drawings. The same reference numbers in different drawings may identify the same or similar elements.

Systems and/or methods described herein determine audio routing for an incoming call based on mobile device handling actions of a user. When an incoming call is detected, a mobile device may identify if an external audio connection (e.g., a wired/wireless connection to external speakers) is present. If there is an external audio connection, the mobile device may monitor the user's handling pattern of the mobile device (e.g., a combination of movements, voice indications, and/or proximity) during the call notification period. If a recognized change in orientation of the mobile device occurs during the call notification period, the mobile device may override the external audio connection to route the call audio to an ear speaker of the mobile device.

FIG. 1 provides an illustration of concepts described herein. At a time $t_1$, a mobile device 100 may be wirelessly connected to an external speaker 110 (e.g., a set of headphones) that are not currently being used by a user. Although not currently positioned over the user's ears, any sound generated through mobile device 100 is routed to external speaker 110. At a time $t_2$, an incoming call is received at mobile device 100. The user instinctively picks up mobile device 100 and places mobile device near the user's ear. According to implementations described herein, mobile device 100 may recognize the handling of mobile device 100 as an intent to use an ear speaker on the mobile device (and not external speakers 110) to take the incoming call. Based on this recognition, mobile device 100 may automatically answer the call and route the incoming call audio to the ear speaker on the mobile device instead of the external speaker 110. Similarly, outgoing audio may be routed through an integrated microphone of mobile device 100 instead of an external microphone (e.g., associated with external speaker 110).

As used herein, the term "call" may include any type of voice call, such as voice over IP (VoIP) calls, Public Switched Telephone Network (PSTN) calls, cellular service calls, etc., as well as voice interactions with other speech-based services, such as text-to-speech, augmented reality, or an intelligent personal assistant. Although FIG. 1 shows an exemplary implementation with external speakers 110 as wireless headphones, in other implementations, mobile device 100 may be connected to other kinds of wired and/or wireless devices. For example, external speakers 110 may include wired headphones, portable speakers, a hands-free headset, an external display (e.g., a television or monitor), a home audio system, or a car audio system.

FIG. 2 shows an exemplary mobile device 100 in which concepts described herein may be implemented. In an exemplary implementation, mobile device 100 may be a mobile terminal. As used herein, the term "mobile terminal" may include a cellular or mobile telephone; a smart phone which may combine a cellular telephone with data processing capabilities, Internet/Intranet access, Web browser, organizer, calendar and/or a global positioning system (GPS) receiver; a consumer electronics device or other appliance that includes telephone transceiver (e.g., VoIP) capabilities; or another type of hand-held computational or communication device. Mobile terminals may also be referred to as "pervasive computing" devices.

Referring to FIG. 2, mobile device 100 may include a housing 210, a speaker 220, a display 230, control buttons 240, sensors 250, a microphone 260, an audio port 270, and a camera 280. Housing 210 may protect the components of mobile device 100 from outside elements. Speaker 220 may provide audible information to a user of mobile device 100. For example, speaker 220 may function as an integrated ear speaker when a user is engaged in a communication session using mobile device 100.

Display 230 may provide visual information to the user. For example, display 230 may provide information regarding incoming or outgoing telephone calls, electronic mail (e-mail), instant messages, short message service (SMS) messages, etc. Display 230 may also display information regarding various applications, such as a messaging or notes application stored in mobile device 100, a phone book/contact list stored in mobile device 100, the current time, video games being played by a user, downloaded content (e.g., news or other information), songs being played by the user, etc. In one implementation, display 230 may be a touch screen display device that allows a user to enter commands and/or information via a finger, a stylus, a mouse, a pointing device, or some other device. For example, display 230 may be a resistive touch screen, a capacitive touch screen, an optical touch screen, an infrared touch screen, a surface acoustic wave touch screen, or any other type of touch screen device that registers an input based on a contact with the screen/display 230.

Control buttons 240 may permit the user to interact with mobile device 100 to cause mobile device 100 to perform one or more operations, such as place/answer a telephone call, play various media, perform dedicated functions (e.g., back, home, etc.), etc. In an exemplary implementation, control buttons 240 may include one or more buttons that controls various applications associated with display 230.

Sensors 250 may collect and provide, to device 100, information that is used to detect, for example, motion (e.g., motion of mobile device 100), orientation (e.g., tilt), proximity (e.g., a distance between a user and device 100), touch (e.g., a user's grip on mobile device 100), or other types of information. In another implementation, sensors 250 may include audio input devices (e.g., microphone 260) and/or image capturing devices (e.g., camera 280). Generally, according to implementations described herein, sensors 250 may provide indications of grip, movement, orientation, proximity, images, and/or voice commands that can be used (e.g., by mobile device 100) to detect an intention of a user to receive audio via an ear speaker (e.g., speaker 220).

Microphone 260 may receive audible information from the user for voice transmissions or for activating applications stored within mobile device 100. For example, microphone 260 may receive audio signals from the user and may output electrical signals corresponding to the received audio signals.

Audio port 270 may include a port to receive a jack to, for example, divert sound from speaker 220 to an external earpiece, speaker, or headphone set. In one implementation, functions of audio port 270 or other input/output components for mobile device 100 may replicated by various communication interfaces, such as a short-range wireless interface (e.g., a BLUETOOTH interface using IEEE 802.15 standards or a Wi-Fi interface using IEEE 802.11 standards).

Camera 280 may include components that allow mobile device 100 to capture still and/or moving images. Camera 280 may include a lens and shutter as well as other conventional camera elements used to capture images. For example, camera 280 may include a charge-coupled device, a complementary metal-oxide-semiconductor (CMOS) active pixel sensor, and/or another type of sensor. In another implementation, camera 280 may include a depth sensing camera to detect distances of objects relative to camera 280. More particularly, the depth sensing camera may assign distances to each pixel of an image. For example, camera 280 may transmit invisible near-infrared light and may measure the light's return path (e.g., "time-of-flight") after the light reflects off the objects to determine distances to the objects.

Although FIG. 2 shows exemplary components of mobile device 100, in other implementations, mobile device 100 may contain fewer, different, differently-arranged, or additional components than depicted in FIG. 2. For example, although mobile device 100 shown in FIG. 2 includes a number of control buttons 240, it should be understood that mobile device 100 need not include such features. Rather, in some implementations, mobile device 100 may include touch screen display 230 alone, or in combination with fewer control buttons 240. In other implementations, device 100 may include a keypad or keyboard in addition to, or instead of control buttons 240.

FIG. 3 is a diagram illustrating exemplary components of mobile device 100. As shown in FIG. 3, mobile device 100 may include a processor 310, memory 320, storage unit 330, input component 340, output component 350, communication interface 360, and communication path 370.

Processor 310 may include a processor, a microprocessor, an Application Specific Integrated Circuit (ASIC), a Field Programmable Gate Array (FPGA), and/or other processing logic (e.g., audio/video processor) capable of processing information and/or controlling device 100. Memory 320 may include static memory, such as read only memory (ROM), and/or dynamic memory, such as random access memory (RAM), or onboard cache, for storing data and machine-readable instructions. Storage unit 330 may include storage devices, such as flash memory or other types of storage devices.

Input component 340 and output component 350 may include a display screen, a keyboard, a touch panel, a speaker (e.g., speaker 260), a microphone (e.g., microphone 250), Universal Serial Bus (USB) port, and/or other types of components for converting physical events or phenomena to and/or from digital signals that pertain to device 100.

Communication interface 360 may enable mobile device 100 to communicate with other devices and/or systems. Communication interface 360 may include a transmitter that may convert baseband signals to radio frequency (RF) signals and/or a receiver that may convert RF signals to baseband signals. Alternatively, communication interface 360 may include a transceiver to perform functions of both a transmitter and a receiver. Communication interface 360 may be coupled to an antenna for transmission and reception of the RF signals. Communication interface 360 may include a wireless network interface (e.g., UTCP, LTE, or another broadband wireless interface) card for wireless communications. Communication interface 360 may also include, for example, a universal serial bus (USB) port for communications over a cable, a BLUETOOTH wireless interface for communicating with BLUETOOTH devices in a personal area network (PAN), a Wi-Fi interface for communication with devices in a wireless local area network (WLAN), a near-field communication (NFC) interface, etc. For example, in one implementation, mobile device 100 may communicate with a headset or external speakers via a BLUETOOTH interface. In another implementation, communication interface 360 may implement a wireless communication protocol, such as UTCP, LTE, GSM, CDMA, WCDMA, GPRS, EDGE, etc. to, for example, initiate and receive calls.

Communication path 370 may provide an interface through which components of mobile device 100 can communicate with one another.

As will be described in detail below, mobile device 100 may perform certain operations relating to parameter tuning. Mobile device 100 may perform these operations in response to processor 310 executing software instructions stored in a computer-readable medium, such as memory 320. A computer-readable medium may be defined as a non-transitory memory device. A memory device may include memory space within a single physical memory device or spread across multiple physical memory devices. The software instructions may be read into memory 320 from another computer-readable medium, or from another device via communication interface 360. The software instructions contained in memory 320 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

In different implementations, mobile device 100 may include additional, fewer, different, or differently-arranged components than the ones illustrated in FIG. 3. For example, mobile device 100 may include additional network interfaces, such as interfaces for receiving and sending data packets. In another example, mobile device 100 may include a tactile input device.

FIG. 4 is a block diagram of functional components of mobile device 100. Functions described in connection with FIG. 4 may be performed, for example, by processor 310 executing instructions stored in memory 320. As shown in FIG. 4, mobile device 100 may include a call detector 410, an auxiliary output monitor 420, a sensor aggregation module 430, a pattern matching module 440, and an audio routing module 450.

Call detector 410 may receive an indication of an inbound call directed to mobile device 100. In one implementation, call detector 410 may detect a call directly from an inbound call message from a wireless network base station. In another implementation, call detector 410 may detect an internal response to the inbound call message, such as a ring-tone command or another alert signal that is generated by mobile device 100 in response to receiving an inbound call message. Upon detecting an indication of an inbound call, call detector 410 may signal auxiliary output monitor 420.

Auxiliary output monitor 420 may determine if one or more external audio devices (e.g., external speakers 110) are connected to mobile device 100 at the time the inbound call is detected. For example, auxiliary output monitor 420 may determine if any active wired and/or wireless audio connections are present in mobile device 100. In an exemplary implementation, auxiliary output monitor 420 may interface with an operating system of mobile device 100 to determine a physical connection and/or an active wireless pairing. Active wired connections may include, for example, connections to headphones and/or speakers via audio port 270. Wireless audio connections may include, for example, connections to other devices via BLUETOOTH, Wi-Fi, NFC, or other wireless communication protocols. Other devices that may be detected by auxiliary output monitor 420 may include, for example, wireless headphones, wireless speakers, car audio systems, televisions, etc. In one implementation, if auxiliary output monitor 420 detects that an external speaker is connected when an inbound call is received, auxiliary output monitor 420 may send a signal to sensor aggregation module 430.

Sensor aggregation module 430 may activate and/or monitor sensors to detect user handling of mobile device 100 in response to an incoming call. For example, sensor aggregation module 430 may use one or more sensors 250 to detect movement, orientation, voice signals, and/or proximity of mobile device 100 during the inbound call notification period (e.g., during a ringing period associated with the notification). Sensors managed by sensor aggregation module 430 may include for example, an accelerometer, a gyroscope, a magnetometer, a proximity sensor, a camera (e.g., camera 280), touch sensors, and/or a microphone. Monitored movement may include, for example, an upward motion in an arc that would be indicative of a user raising mobile device 100 to an ear. A monitored orientation may include, for example, a predominantly vertical position of mobile device 100. A voice signal may include, for example, voice recognition of a conventional greeting (e.g., "hello"). A monitored proximity may include a distance from a portion of mobile device 100 to another surface (e.g., a user's ear/head). In other implementations, sensor aggregation module 430 may use fewer, different, or additional sensors than those described above. Sensor aggregation module 430 may forward collected sensor data to pattern matching module 440.

Pattern matching module 440 may compare data received from sensor aggregation module 430 with stored data patterns. Pattern matching module 440 may store and retrieve the data patterns from a local memory (e.g., memory 320). The stored data patterns may include sensor data that would be indicative of a user placing an ear speaker (e.g., speaker 220) of mobile device 100 near the user's ear. In one example, a stored data pattern may include movement of mobile device 100 upwards in an arc (e.g., toward the user's ear) with resulting placement of a portion (e.g., speaker 220) of mobile device 100 in close proximity to the user. In another example, a stored data pattern may include a portion (e.g., speaker 220) of mobile device 100 in close proximity to the user and a recognized voice input (e.g., "hello?"). In some instances, pattern matching module 440 may include a self-learning component. Thus, pattern matching module may store actual data patterns from particular users that represent positioning mobile device 100 near a user's ear.

In one implementation, pattern matching module 440 may apply one or more filtering and/or pattern-matching techniques to determine if sensor input from sensor aggregation module 430 corresponds to a known handling pattern. If pattern matching module 440 detects that a user has placed mobile device 100 in a position to receive sound via an ear speaker, pattern matching module 440 may send a signal to audio routing module 450 to request an override of current audio routing (e.g., to external speakers 110).

Audio routing module 450 may answer an incoming call and route the incoming call audio to an ear speaker of mobile device 100. For example, upon receiving a signal from pattern matching module 440, audio routing module 450 may temporarily override an existing external speaker connection and route audio from the incoming call to speaker 220 of mobile device 100. Similarly, audio routing module 450 may temporarily override routing of audio output from an external microphone to integrated microphone 260. In one implementation, audio routing module 450 may continue routing the call audio to speaker 220 for the duration of the call (e.g., regardless of additional user handling of mobile device after the call is answered). In another implementation, audio routing module 450 may provide a user interface to allow a user to selectively re-engage the external speakers after audio routing module 450 performs the initial override.

Although FIG. 4 shows example functional components of mobile device 100, in other implementations, mobile device 100 may include fewer, different, and/or additional functional components than depicted in FIG. 4. Alternatively, or additionally, one or more functional components of mobile device 100 may perform one or more other tasks described as being performed by one or more other functional components of mobile device 100.

FIG. 5 is a flow diagram of an exemplary process 500 for automatically routing audio for an incoming call according to an implementation described herein. In one implementation, process 500 may be performed by mobile device 100. In another implementation, process 500 may be performed by one or more other devices including or excluding mobile device 100.

Process 500 may include detecting an incoming call (block 510). For example, mobile device 100 (e.g., call detector 410) may receive an indication of an inbound call directed to mobile device 100. In one implementation, the indication may be in the form of a message from a wireless network base station. In another implementation, the indication may be an internal signal, such as a ring-tone or another alert signal, that is generated by mobile device 100 in response to receiving the incoming call indication from the base station.

Process 500 may also include identifying whether external speakers are connected (block 520). For example, mobile device 100 (e.g., auxiliary output monitor 420) may determine if any active wired and/or wireless audio connections are present. In one implementation, auxiliary output monitor 420 may interface with an operating system of mobile device 100 to determine an active wireless pairing and/or physical connection. Active wired connections may include, for example, connections to headphones and/or speakers via audio port 270. Wireless audio connections may include, for example, connections to other devices via BLUETOOTH, Wi-Fi, NFC, or other wireless communication protocols. Other devices may include, for example, wireless headphones, speakers, car audio systems, televisions, etc.

If external speakers are connected (block 520—YES), process 500 may further include monitoring handling of the mobile device (block 530). For example, mobile device 100 (e.g., sensor aggregation module 430) may use sensors 250 to detect user handling of mobile device 100 during the inbound call notification period. Monitoring the handling of mobile device 100 may include collecting data from one or more sensors (e.g., sensors 250) during the notification period (e.g., ringing) of the call. In one implementation, monitoring the handling of mobile device 100 may also include collecting sensor data for a time period (e.g., a few seconds) prior to a call notification. Sensor data collected prior to the call notification may provide a baseline and/or indicate whether mobile device may already be in position for a user to receive audio via an ear speaker, such as speaker 220. In one implementation, sensor aggregation module 430 may collect one or more types of sensor data that may be provided to pattern matching module 440.

As shown in FIG. 6, sensor aggregation module 430 may collect, for example, movement data 610, orientation data 620, proximity data 630, touch data 640, image data 650, and/or voice data 660. Sensor aggregation module 430 may detect movement data 610 (e.g., from an accelerometer, from still images or video from camera 280, or from another sensor) as an indication a user's movement of mobile device 100. In one example, device orientation module 430/sensor 250 may detect movement of mobile device 100 upwards (e.g., toward the user's ear). Detection of orientation data 620 (e.g., from any of an accelerometer, gyroscope, magnetometer, etc.) may indicate the tilt of mobile device 100. Detection of proximity data (e.g., from a proximity sensor, depth camera, conventional camera image, etc.) may indicate a distance from a portion of mobile device 100 to another surface (e.g., a user's ear/head). Detection of touch data may be used to identify a user's grip or holding position for device 100. Detection of image data (e.g., from camera 280) may include still or video images that may indicate if particular objects, such as an ear or hair, are directly in front of mobile device 100. Detection of voice data (e.g., from microphone 260) may include user voice data, such as language indicative of a user's intent to answer a call. Although shown in a particular sequence in FIG. 6, in other implementations the data may be collected simultaneously or in a different order. Furthermore, in some cases, not all types of data shown in FIG. 6 may be collected.

Returning to FIG. 5, process 500 may further include determining if a recognized handling pattern can be detected (block 540). For example, mobile device 100 (e.g., pattern matching module 440) may apply data from sensor aggregation module 430 to stored handling patterns. The stored handling patterns may include movement, orientation, voice signals and/or proximity data that are indicative of a user placing mobile device 100 near a user's ear (e.g., in a typical position to receive audio via an ear speaker, such as speaker 220). In one implementation, device orientation module 430 may apply one or more filtering and/or pattern-matching techniques to determine if sensor input from sensor aggregation module 430 corresponds to a known handling pattern. In one implementation, sensor aggregation module 430 may implement a hierarchy of data based on an expected sequence of user handling to answer a call. For example, a typical handling sequence may include a gripping motion, moving mobile device 100, orienting mobile device 100 vertically, and placing mobile device in proximity to a user's ear. Pattern matching module 440 may detect (e.g., based on data from sensor aggregation module 430) whether a handling sequence corresponds to a known handling sequence for positioning mobile device 100 near a user's ear. In another implementation, pattern matching module 440 may require a matching pattern of one, two, or more types of known handling data. For example, pattern matching module 440 may recognize a call answering pattern based only on movement data if the pattern match provides a high level of confidence. If the confidence level for matching the movement pattern is low (e.g., below a required confidence threshold), pattern matching module 440 may require additional types of data (e.g., proximity data, orientation data, etc.). In other implementations, pattern matching module 440 may rely on other combinations of sensor data to detect a user's intent to receive call audio via an ear speaker.

If a recognized handling pattern can be detected (block 540—YES), process 500 may include answering the incoming call and routing the incoming call audio to an ear speaker of the mobile device (block 550). For example, mobile device 100 (e.g., audio routing module 450) may temporarily override the existing external speaker connection to route audio from the incoming call to an ear speaker of mobile device 100 (e.g., speaker 220). In one implementation, audio routing module 450 may continue routing the call audio to speaker 220 for the duration of the call. In another implementation, audio routing module 450 may provide a user interface to allow a user to selectively re-engage the external speakers after an initial override.

If external speakers are not connected (block 520—NO) or if a recognized handling pattern cannot be detected (block 540—NO), process 500 may include applying default answering procedures for the incoming call (block 560). For example, mobile device 100 may rely on user input and/or continue to use previously-employed audio routing for the incoming call. Routing of the call audio may default to speaker 220, for example, if no external speakers are connected. In another example, routing of the call audio may default to the external speakers if the speakers are connected and the user provides manual input to answer the incoming call. Mobile device 100 may receive direct user input (e.g., via one of control buttons 240 or touch screen display 230) to answer the incoming call. In another implementation, user input may be provided via buttons or other mechanisms associated with the external speakers (e.g., external speakers 110) to answer the incoming call.

Systems and/or methods described herein may determine where to route incoming call audio for a mobile device based on the user handling pattern of the mobile device. The systems and/or methods may receiving notification of an incoming call and identify that an external speaker is connected to the mobile device. The systems and/or methods may detect that a user has positioned the mobile device in a position, relative to the user, to use an integrated ear speaker. The systems and/or methods may route audio for the incoming call away from the external speaker and to the integrated ear speaker when the mobile device detects that the user has positioned the mobile device in position to use the integrated ear speaker.

The foregoing description of implementations provides illustration, but is not intended to be exhaustive or to limit the implementations to the precise form disclosed. Modifications and variations are possible in light of the above teachings or may be acquired from practice of the teachings. For example, in another implementation, call routing techniques described herein may be used to indicate to mobile device 100 that a user who receives an incoming video-telephony call does not want to use video services, but instead answer the call as a voice-only call.

In the above, while a series of blocks has been described with regard to the exemplary process of FIG. 5, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, by a mobile device, notification of an incoming call;
   identifying, by the mobile device, that an external speaker is connected to the mobile device;
   detecting, by the mobile device, that a user has positioned the mobile device in a position, relative to the user, to use an integrated ear speaker of the mobile device; and
   routing, by the mobile device, audio for the incoming call away from the external speaker and to the integrated ear speaker when the mobile device detects that the user has positioned the mobile device in position to use the integrated ear speaker.

2. The method of claim 1, further comprising:
   answering the call when the mobile device detects that the user has positioned the mobile device in position to use the integrated ear speaker.

3. The method of claim 1, wherein the detecting further comprises:
   monitoring handling activities for the mobile device during a ringing period associated with the notification,
   comparing data from the monitored handling activities against stored handling patterns that are indicative of positioning the mobile device near the user's ear, and
   identifying a match between the monitored data and one of the stored handling patterns.

4. The method of claim 3, wherein the monitoring the handling activities includes collecting one or more of:
   proximity sensor data,
   accelerometer data,
   gyroscope data,
   magnetometer data,
   touch data, or
   camera data.

5. The method of claim 4, wherein the monitoring the handling activities further includes collecting voice data.

6. The method of claim 1, wherein the routing audio for the incoming call includes overriding default audio routing to the external speakers.

7. The method of claim 1, wherein the external speakers are connected via a wireless connection.

8. The method of claim 1, wherein the external speakers are connected via a wired connection.

9. The method of claim 1, wherein the external speakers include one or more of headphones, portable speakers, a hands-free headset, an external display, a home audio system, or car audio system.

10. A mobile device, comprising:
    an integrated ear speaker for outputting sound;
    an interface to divert sound from the integrated ear speaker to an external speaker;
    a memory to store a plurality of instructions; and
    a processor configured to execute the instructions in the memory to:
    receive notification of an incoming audio call;
    identify that the external speaker is connected to the mobile device;
    detect that a user has moved the mobile device in a position to use the integrated ear speaker; and
    route audio for the incoming call to the integrated ear speaker when the mobile device detects that the user has positioned the mobile device in position to use the integrated ear speaker.

11. The mobile device of claim 10, wherein the processor is further configured to execute instructions in the memory to:
    answer the call when the mobile device detects that the user has moved the mobile device in position to use the integrated ear speaker.

12. The mobile device of claim 11, wherein, when, detecting that the user has moved the mobile device, the processor is further configured to execute instructions in the memory to:
    monitor handling activities for the mobile device during a ringing period associated with the notification,
    compare data from the monitored handling activities against stored handling patterns that are indicative of positioning the mobile device near the user's ear, and
    identify a match between the monitored data and one of the stored handling patterns.

13. The mobile device of claim 12, wherein, when monitoring the handling activities, the processor is further configured to execute instructions in the memory to:
    collect proximity sensor data,
    collect accelerometer data,
    collect gyroscope data,
    collect magnetometer data,
    collect touch data, or
    collect camera data.

14. The mobile device of claim 13, wherein, when monitoring the handling activities, the processor is further configured to execute instructions in the memory to collect voice data.

15. The mobile device of claim 10, wherein, when routing audio for the incoming call, the processor is further configured to execute instructions in the memory to override default audio routing to the external speakers.

16. The mobile device of claim 10, wherein the mobile device comprises:
    a smart phone,
    a cellular telephone, or
    a hand-held computational device.

17. The mobile device of claim 10, wherein the interface includes an audio port that supports a wired interface with the external speakers.

18. The device of claim 10, wherein the interface comprises one or more of:
    a personal area network (PAN) interface, a near-field communication (NFC) interface, or a wireless local area network (WLAN) interface for communicating with the external speakers.

19. A tangible, non-transitory computer-readable medium containing instructions executable by at least one processing unit, the computer-readable medium, comprising one or more instructions for:
    receiving notification of an incoming call to a mobile device;
    identifying that an external speaker is connected to the mobile device;
    detecting that a user has positioned the mobile device in a position, relative to the user, to use an integrated ear speaker of the mobile device;

answering the incoming call when the mobile device detects that the user has positioned the mobile device in position to use the integrated ear speaker; and routing audio for the incoming call away from the external speaker and to the integrated ear speaker when the mobile device detects that the user has positioned the mobile device in position to use the integrated ear speaker.

20. The computer readable medium of claim 19, further comprising one or more instructions for:

detecting that the incoming call has been terminated; and routing post-call audio to the external speaker based on the detecting that the incoming call has been terminated.

\* \* \* \* \*